United States Patent [19]
Coleman et al.

[11] Patent Number: 5,690,535
[45] Date of Patent: Nov. 25, 1997

[54] TWIN SPINS SPIN POP

[76] Inventors: Thomas J. Coleman, 19170 Paddock Pl.; William K. Schlotter, IV, 20308 Alvarado Rd.; Princess Ann Coleman, 19170 Paddock Pl.; Ann M. Schlotter, 20308 Alvarado Rd., all of Abingdon, Va. 24211

[21] Appl. No.: 676,680

[22] Filed: Jul. 10, 1996

[51] Int. Cl.⁶ .......................... A23G 03/00; A63H 33/00
[52] U.S. Cl. .................. 446/236; 446/484; 446/491; 426/104; 426/134
[58] Field of Search .................. 446/71, 76, 236, 446/386, 491, 484, 266, 40, 37, 38, 218; 426/104, 134; 40/430

[56] References Cited

U.S. PATENT DOCUMENTS

| | | | |
|---|---|---|---|
| 1,984,843 | 12/1934 | Schoenfeld | 446/218 |
| 2,799,587 | 7/1957 | Schwartz | 446/236 |
| 3,229,416 | 1/1966 | Bross | 446/38 |
| 5,209,692 | 5/1993 | Coleman et al. | 446/266 |
| 5,391,107 | 2/1995 | Coleman | 426/134 |
| 5,471,373 | 11/1995 | Coleman et al. | 362/109 |
| 5,503,857 | 4/1996 | Coleman et al. | 426/134 |
| 5,536,054 | 7/1996 | Liaw | 446/236 |

FOREIGN PATENT DOCUMENTS

| | | | |
|---|---|---|---|
| 502811 | 5/1951 | Belgium | 426/134 |
| 670044 | 9/1963 | Canada | 446/37 |
| 2222656 | 3/1990 | United Kingdom | 446/236 |

OTHER PUBLICATIONS

"Gift #822", holiday catalog, Christmans, 1979.

Primary Examiner—Robert A. Hafer
Assistant Examiner—Jeffrey D. Carlson
Attorney, Agent, or Firm—Melvin L. Crane

[57] ABSTRACT

An improved candy pop holding device which includes two different spindle shafts each including a receptacle for holding a stick of a candy pop. The device includes a power supply, a switch for controlling the power supply, a motor for driving a suitable gearing system for rotating the two candy pops at a convenient rotation for consumption by a consumer. The motor and gearing system is designed to produce a desired torque and rotational speed to spin the two candy pops.

3 Claims, 2 Drawing Sheets

TWIN SPINS SPIN POP

BACKGROUND OF THE INVENTION

This invention is an improvement over U.S. Pat. No. 5,209,692 which is incorporated herein by reference.

U.S. Pat. No. 5,209,692 is directed to a combination of a motor which drives a single sucker or pop to spin the pop while being consumed. The related prior art has been cited in the patent.

SUMMARY OF THE INVENTION

This invention is directed to a drive motor and appropriate gearing to spin two spin pops at the same time so that a consumer can taste each of the pops as desired by the consumer.

It is therefore an object of the invention to provide two spin pops from which a consumer has a choice of consuming each pop alternatively or in any order desired.

Another object is to provide two spin pops which are driven simultaneously by the same motor in which the two pops could be shared by two people alternating between consumption of their own pop.

Still another object is to provide a twin drive for spinning two pops simultaneously in which only one pop could be used in only one of the spinning drives, if desired.

These, and other objects will become clearer to one skilled in the art when related to the description and the drawings.

DETAILED DESCRIPTION OF THE INVENTION

Figure 1:
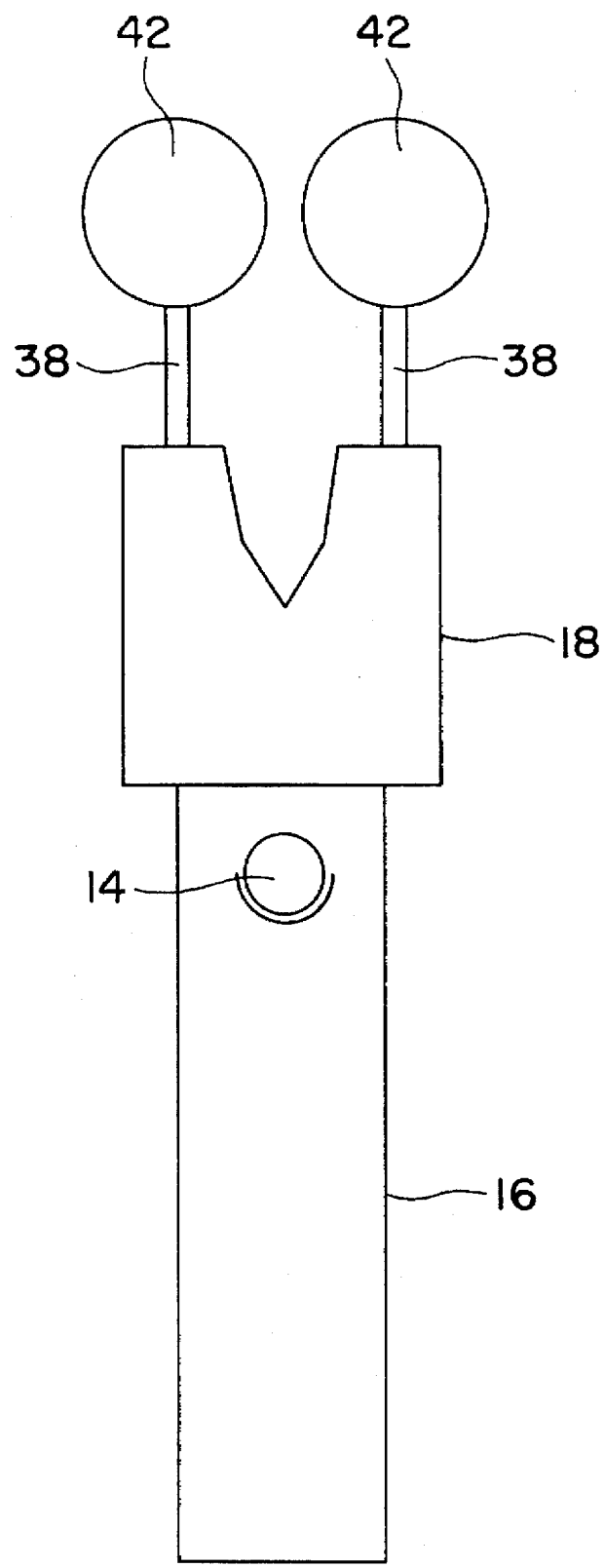
FIG. 1 illustrates a side view of a pair of motor driven spin pops.
Figure 2:
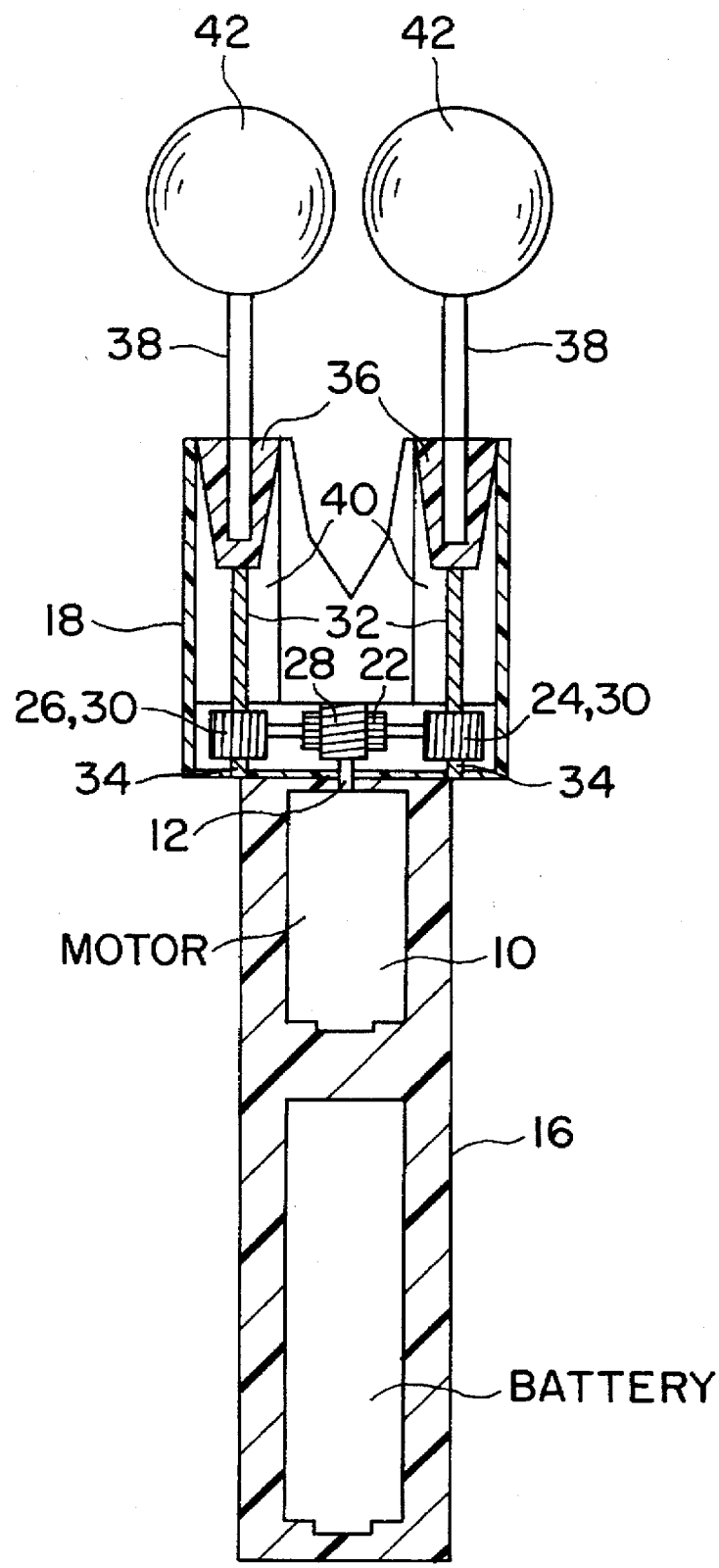
FIG. 2 illustrates a partial cross sectional view.
Figure 3:
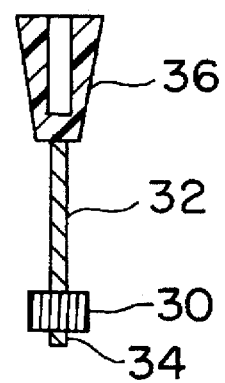
FIG. 3 illustrates a vertical drive to which the pop stick is attached for spinning the pop.

Now referring to the drawings wherein the same reference characters are used for the same or like parts throughout the drawings. As shown, the device includes a battery operated, small motor 10 which drives a suitable gearing that drives an output spindle shaft 12 such as set forth in U.S. Pat. No. 5,209,692. The motor is controlled by a switch 14 and the battery or batteries and gearing that drives the spindle shaft 12 is in a lower housing portion 16 that is unitarily connected to an upper housing 18. The upper housing includes a driven shaft 20 which is perpendicular to the spindle shaft 12. The shaft 20 includes a central gear 22 and oppositely disposed gears 24, 26 on each end of the shaft. A gear 28 is driven by the spindle shaft 12 which in turn drives the central gear 22 on the shaft 20. Each of the end gears 24, 26 drive a gear 30 which is shown more clearly in FIG. 3. The gear 30 is secured to a driven spindle shaft 32 which is perpendicular with the driven shaft 20. The bottom end of the spindle shaft 32 has a knob 34 that fits into a hole in the housing for holding the shaft spindle 32 in place at the bottom end. The upper end of the spindle shaft 32 has a candy stick receptacle 36 into which an end of a candy stick 38 is inserted. The upper end of the outside area of the candy stick receptacle fits within a passage 40 in the upper housing which functions as a bearing surface for rotation within the housing. The upper end of the stick has a pop 42 contained thereon.

In operation, a battery or batteries are properly placed within the lower housing to supply electrical power to the motor. The sticks of the twin pops are inserted into the candy stick receptacle and the device is ready for operation. The switch is pressed inwardly to close the switch which permits a flow of current to the motor for operation of the motor. The motor drives the gearing in the lower housing which are designed to drive the spindle shaft 12 at a proper torque in order to rotate the central gear 28 that drives the gear 22 which rotates the driven shaft 20 and the end gears 24, 26. The end gears 24, 26 simultaneously drives the gears 30 which rotate the two spindle shafts 32 and consequently rotate the two spin pops. As shown, with the two end gears 24, 26 driving the gears 30, as shown, the twin pops will be rotated in opposite directions. In order to rotate the twin pops in the same direction would require changing the gear assembly for the gears 24, 26 and/or the gears 30.

The housing, drive shafts, gears, etc. can be made of plastic for less expensive manufacture. The bottom housing is made with an opening with a closure so that the battery or batteries; that is, power supply can be replaced when discharged. Also, the candy pop sticks are removeable for replacing the twin pops.

In manufacture of the device there should not be any sharp corners etc. by which one would be injured. Further, the lower and upper housings can be of decorative design and the upper housings could be made as any monster, animal etc. or any design so long as the operative mechanism is such as set forth for spinning the twin pops.

What is claimed is:

1. An improved candy holding device which comprises a housing, said housing including a bottom portion (16) and an upper portion (18), said bottom portion of said housing including a power supply, a motor, a gearing system driven by said motor and a switch (14) for controlling the power supply, said gearing system including a first spindle shaft (12), and a first drive gear (28) on an end of said first spindle shaft, the upper portion of said housing including an improvement that includes a gearing means which is driven by said first drive gear (28), said gearing means drives parallel second and third spindle shafts (32), each of said second and third spindle shafts rotate a candy pop which is secured to each of said second and third spindle shafts by a candy holding stick (38).

2. An improved candy holding device as set forth in claim 1, in which said gearing means includes: a driven shaft (20) which is perpendicular with said first spindle shaft, said driven shaft (20) includes a central driven gear (22), which is driven by said first drive gear (28) on an end of said first spindle shaft, said driven shaft (20) including a second drive gear (24, 26) on opposite ends thereof, each of said second drive gears (24, 26) drive a second driven gear (30) on a lower end of each of said second and third spindle shafts (32), and an upper end of each of said second and third spindle shafts include a candy stick receptacle which receives an end of a candy stick which is free of any candy.

3. An improved candy holding device as set forth in claim 2; in which, said upper housing portion includes a separate passage in which each of said second and third spindle shafts rotate, and each of said separate passages has an end portion that serves as a bearing surface for rotation of said candy stick receptacle.

* * * * *